(12) United States Patent
Nakamura

(10) Patent No.: US 9,333,805 B2
(45) Date of Patent: May 10, 2016

(54) PNEUMATIC RADIAL TIRE

(75) Inventor: Keisuke Nakamura, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 213 days.

(21) Appl. No.: 13/992,812

(22) PCT Filed: Dec. 19, 2011

(86) PCT No.: PCT/JP2011/079377
§ 371 (c)(1),
(2), (4) Date: Jun. 10, 2013

(87) PCT Pub. No.: WO2012/086594
PCT Pub. Date: Jun. 28, 2012

(65) Prior Publication Data
US 2013/0263994 A1 Oct. 10, 2013

(30) Foreign Application Priority Data

Dec. 21, 2010 (JP) .................. 2010-285044

(51) Int. Cl.
*B60C 9/20* (2006.01)
*B60C 9/28* (2006.01)
(Continued)

(52) U.S. Cl.
CPC ............... *B60C 9/28* (2013.01); *B60C 9/0007* (2013.04); *B60C 9/20* (2013.01); *B60C 9/2006* (2013.04); *D07B 1/0613* (2013.01); *B60C 9/0064* (2013.04); *B60C 2009/2067* (2013.04); *B60C 2009/2077* (2013.04)

(58) Field of Classification Search
CPC ........ B60C 9/20; B60C 9/2003; B60C 9/2006
See application file for complete search history.

(56) References Cited

U.S. PATENT DOCUMENTS 5,323,828 A 6/1994 Kot et al.
5,343,917 A * 9/1994 Okihara et al. .......... 152/209.18
5,505,243 A * 4/1996 Imamiya et al. ............... 152/527
(Continued)

FOREIGN PATENT DOCUMENTS

| CN | 1638980 A | 7/2005 |
| CN | 101443203 A | 5/2009 |
| JP | 62-234921 A | 10/1987 |
| JP | 05-213007 A | 8/1993 |

(Continued)

OTHER PUBLICATIONS

International Search Report, PCT/JP2011/079377, filed Mar. 27, 2012.

(Continued)

*Primary Examiner* — Justin Fischer
*Assistant Examiner* — Robert Dye
(74) *Attorney, Agent, or Firm* — Sughrue Mion, PLLC

(57) ABSTRACT

A pneumatic radial tire including a carcass composed of at least one carcass layer extending toroidally between a left-and-right pair of bead cores; a tread portion which is arranged on the outside in the tire radial direction of a crown region of the carcass to form a ground contacting portion; and a belt composed of two belt layers which is arranged between the tread portion and the crown region of the carcass to form a reinforcing portion. A reinforcing material constituting the belt layer is a bundle formed by arranging two cords in pairs; and, letting the diameter of a filament constituting the cord a (mm), the interval between the adjacent bundles as an expected value is increased by a/4 (mm) or larger compared to the interval represented by using the circumcircle of the cord.

4 Claims, 4 Drawing Sheets

(51) Int. Cl.
*B60C 9/00* (2006.01)
*D07B 1/06* (2006.01)

(56) References Cited

U.S. PATENT DOCUMENTS

| | | | | |
|---|---|---|---|---|
| 5,827,381 | A | * 10/1998 | Miyazono et al. ............ | 152/526 |
| 2005/0092416 | A1 | 5/2005 | Takagi | |
| 2009/0188600 | A1 | 7/2009 | Kitahara | |

FOREIGN PATENT DOCUMENTS

| | | |
|---|---|---|
| JP | 07-117406 A | 5/1995 |
| JP | 2001-334810 A | 12/2001 |

OTHER PUBLICATIONS

Communication dated Apr. 14, 2015, issued by the State Intellectual Property Office of P.R. China in counterpart Chinese application No. 201180062101.6.

* cited by examiner

PNEUMATIC RADIAL TIRE

TECHNICAL FIELD

The present invention relates to a pneumatic radial tire (hereinafter, also simply referred to as "tire"), and more particularly, to a pneumatic radial tire having excellent durability and lightweight properties without compromising rigidity.

BACKGROUND ART

At present, a reinforcing member for a carcass constituting a skeleton of a radial tire for passenger vehicle, in particular, a belt which is generally used as a reinforcing member for a crown portion of a carcass is mainly constituted such that two or more steel belt layers composed of layers in which rubberized steel cord obliquely arranged with respect to the tire equatorial plane are used, and that the steel cords in the belt layers are crossed each other.

Conventionally, for the improvement of a belt layer, a variety of studies have been conducted. For example, Patent Document 1 discloses a technique in which several reinforcing elements are used to form a bundle and the bundles are embedded in a belt at a constant interval to improve the durability of the belt. Patent Document 2 discloses that, by using as a belt reinforcing material a steel cord having (1×2) structure, separation which occurs at the belt edge can be inhibited and the weight of a tire is reduced.

RELATED ART DOCUMENTS

Patent Documents

Patent Document 1: Japanese Unexamined Patent Application Publication No. H 5-213007
Patent Document 2: Japanese Unexamined Patent Application Publication No. S 62-234921

SUMMARY OF THE INVENTION

Problems to be Solved by the Invention

In recent years, with the enhanced performance of an automobile, an ever-increasing performance of a tire has been demanded. For the improvement of fuel efficiency, weight reduction of a tire is also an important subject. In such circumstances, the belt structures in Patent Documents 1 and 2 are no longer sufficient regarding the durability and lightweight properties. Also from the viewpoint of performances such as ride quality and steering stability, a belt also needs to be ensured to have a high rigidity.

Accordingly, an object of the present invention is to provide a pneumatic radial tire having excellent durability and lightweight properties without compromising rigidity.

Means for Solving the Problems

In order to resolve the above-mentioned problems, the present inventor intensively studied the structure of a belt to find that the above-mentioned problems can be resolved by employing the below-mentioned structure, thereby completing the present invention.

Specifically, the pneumatic radial tire of the present invention is a pneumatic radial tire comprising: a carcass composed of at least one carcass layer extending toroidally between a left-and-right pair of bead cores; a tread portion which is arranged on the outside in the tire radial direction of a crown region of the carcass to form a ground contacting portion; and a belt composed of at least two belt layers which is arranged between the tread portion and the crown region of the carcass to form a reinforcing portion, wherein a reinforcing material constituting the belt layer is a bundle formed by arranging two cords without twisting them; and the diameters of all filaments constituting the cord are the same, and, letting the diameter a (mm), the interval between the adjacent bundles as an expected value is increased by a/4 (mm) or larger compared to the interval represented by using the circumcircle of the cord.

In the present invention, the thickness of the belt layer is preferably larger than 0.70 mm and smaller than 1.20 mm. In the present invention, the filament diameter is preferably 0.23 to 0.30 mm. Further, in the present invention, the cord preferably has a (1×2) structure.

Effects of the Invention

By the present invention, a pneumatic radial tire having excellent durability and lightweight properties without compromising rigidity can be provided.

MODE FOR CARRYING OUT THE INVENTION

In the following, embodiments of the present invention will be described in detail.

Figure 1:
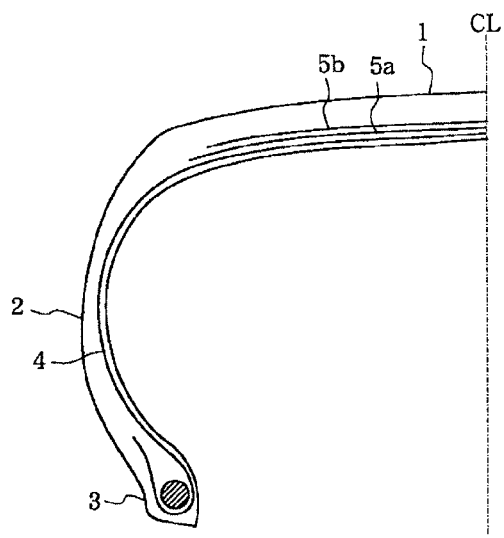
FIG. 1 is a half sectional view illustrating one preferred example a pneumatic tire of the present invention.

FIG. 1 illustrates a pneumatic radial tire according to one embodiment of the present invention. The tire illustrated in the figure comprises a tread portion 1 arranged in a crown region of a carcass to form a ground contacting portion, a pair of sidewall portions 2 continuing to the both sides of the tread portion 1 and extending inward in the tire diameter direction, and a bead portion 3 continuing to the inner radius of each sidewall portion 2.

The tread portion 1, sidewall portion 2 and bead portion 3 are reinforced by a carcass 4 composed of one carcass layer extending toroidally from one bead portion 3 to the other bead portion 3. The tread portion 1 is reinforced by a belt composed of at least two, in the illustrated example, two layers of a first belt layer 5a and a second belt layer 5b which is arranged outside in the tire radial direction of a crown region of the carcass 4 which will be described in detail. Here, a plurality of carcass layers may be used for the carcass 4, and an organic fiber cord extending in a direction nearly orthogonal to the tire circumferential direction, for example, in an angle of 70 to 90° is suitably used.

In the present invention, the reinforcing material constituting the first belt layer 5a and the second belt layer 5b is a bundle formed by arranging two cords without twisting them.

Figure 2:
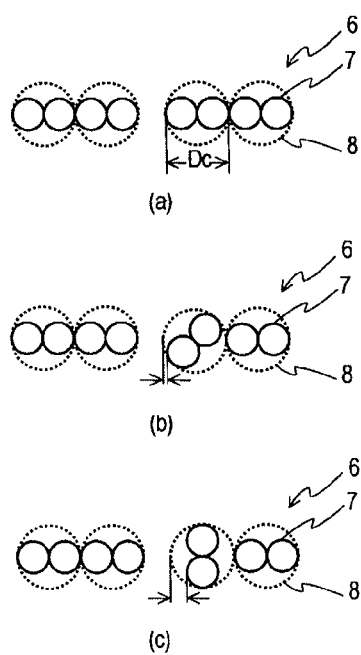
FIG. 2 is a sectional view illustrating an example of change in the cross section of bundles in cases where the bundle is formed by two cords having a (1×2) structure.
Figure 3:
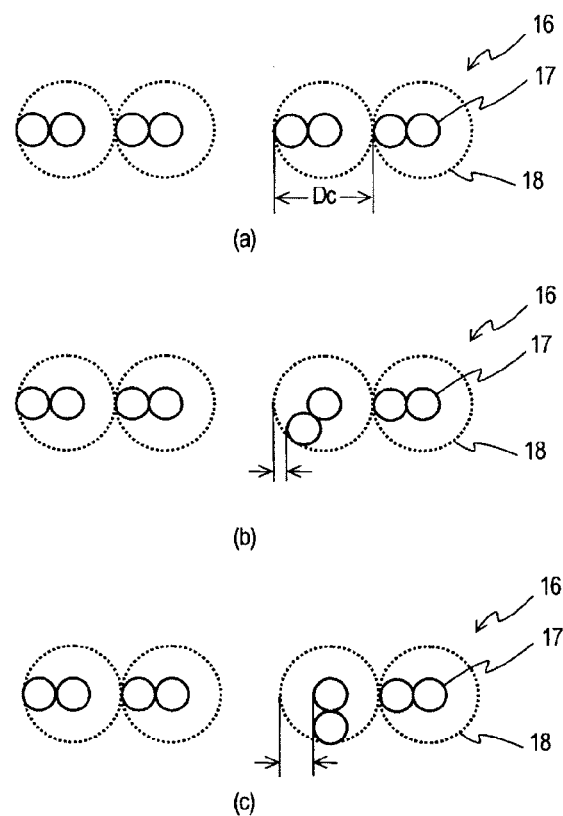
FIG. 3 is a sectional view illustrating an example of change in the cross section of bundles in cases where the bundle is formed by two cords having a (1+1) structure.

By employing as a reinforcing material a bundle formed of two cords, the interval of the reinforcing materials becomes wider in the belt layer compared to cases where the cords are not formed into a bundle, and a belt edge separation in which rubber separation originated from the cord end in the belt width direction easily propagates into adjacent cords can be inhibited. By this, the durability of the belt can be improved. In the present invention, the diameters of all filaments constituting the cord are the same, and, letting the diameter a (mm), the interval between the adjacent bundles as an expected value is increased by a/4 (mm) or larger, preferably by 4a/11 (mm) or larger compared to the interval represented by using the circumcircle of the cord. FIGS. 2(a) to (c) are sectional views illustrating an example of change in the cross sections of cord bundles in cases where the bundle 6 is formed by two cords having a (1×2) structure as a reinforcing material for a belt layer; FIGS. 3(a) to (c) those in cases where the bundle 16 is formed by two cords having a (1+1) structure. First, change in cord diameter will be explained by way of FIG. 2 and FIG. 3.

Normally, cord diameter Dc is represented by the diameter of the circumcircle 8 of filament 7 as illustrated in FIG. 2(a). However, since the cord having a (1×2) structure is a cord formed by twisting two filaments 7, the position of the filament 7 continuously changes in the cord (in the circumcircle 8). For example, when the position of the filament 7 changes by 45° as in FIGS. 2(b), (c), the actual cord diameter in the horizontal direction is smaller than that of the circumcircle 8. This is also true in cases where a cord having a (1+1) structure is used. As illustrated in FIGS. 3(a) to (c), when the position of the filament 17 changes as in FIGS. 3(a) to (c), the actual diameter of cord 16 in the horizontal direction is smaller than that of the circumcircle 18.

In the tire of the present invention, a bundle formed of two cords is used as a belt reinforcing material, and as mentioned above, when the cord diameter changes in the belt width direction, the interval of the adjacent bundles continuously changes in accordance with change in the cord diameter. In other words, a portion where the interval of the adjacent bundles is wide and a portion where the interval of the adjacent bundles is narrow occur. The presence of the portion where the interval of the adjacent bundles is wide allows to more effectively inhibit belt edge separation in which rubber separation originated from the cord end in the belt width direction easily propagates into adjacent cords. As a result, the durability of the belt is further improved. Since there is a portion where the interval of the bundles is narrow, the rigidity of the belt can be maintained.

Figure 4:
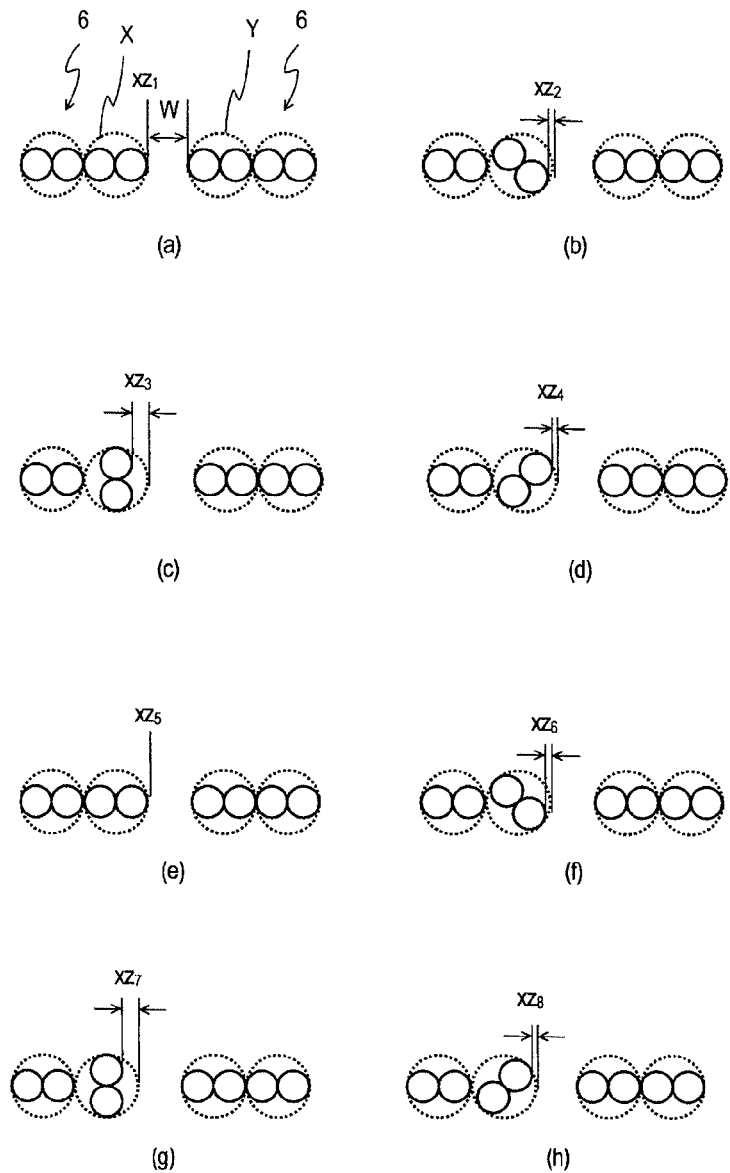
FIG. 4 is an explanatory drawing for calculating an expected value of increment in bundle interval in cases where the bundle is formed by two cords having a (1×2) structure.
Figure 5:
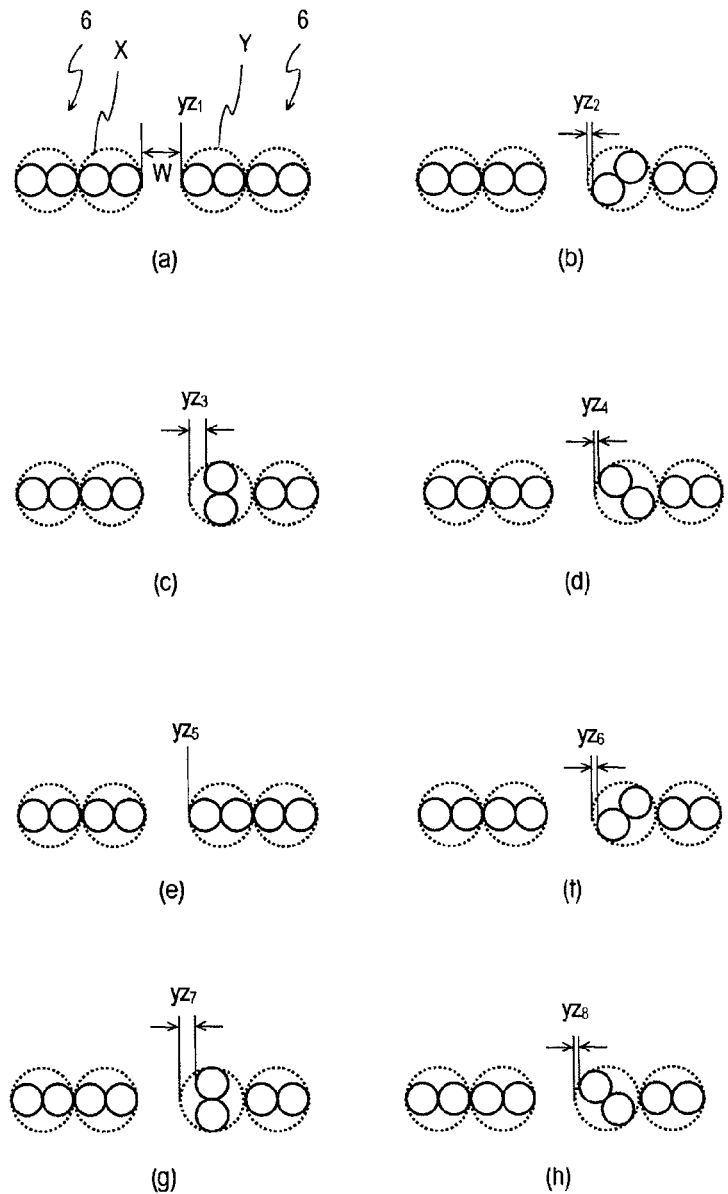
FIG. 5 is an explanatory drawing for calculating an expected value of increment in bundle interval in cases where the bundle is formed by two cords having a (1×2) structure.

Next, the calculation method of an expected value of increment in bundle interval will be explained. FIG. 4 and FIG. 5 are explanatory drawings for calculating an expected value of increment in bundle interval in cases where the bundle is formed by two cords having a (1×2) structure. First, as illustrated in FIG. 4(a), let one cord of the adjacent bundles 6 be cord X the other cord be cord Y, and the distance between the circumcircle of the cord X and the circumcircle of the cord Y be W. Next, let a state in which the distance between the circumcircle of the cord X and the circumcircle of the cord Y and the distance between the filament of the cord X and the filament of the cord Y are the same in the horizontal direction be a basic state of cord X and cord Y (FIG. 4(a)). Each of FIGS. 4(a) to (h) illustrates a cross section of cord X, for example, in a case where the cord X rotates 360° per one pitch, when the cord X is rotated every 45° from the basic state. With reference to FIG. 4(b), by rotating the cord X 45° from the basic state, the actual distance between the cord X and the cord Y becomes larger than W by $xz_2$. Further, when the cord X is rotated every 45° (FIGS. 4(c) to (h)), the increment in the distance between the cord X and the cord Y changes from $xz_3$ to $xz_8$. $xz_1$ in a basic state (FIG. 4(a)) and $xz_5$ in a state where the cord X is rotated 180° from the basic state (FIG. 4(e)) are 0.

Similarly, in the case of cord Y, each of FIGS. 5(a) to (h) illustrates a cross section of cord Y, for example, in a case where the cord X rotates 360° per one pitch, when the cord X is rotated every 45° from the basic state. By rotating the cord Y 45° (FIG. 5(b)) from the basic state (FIG. 5(a)), the actual distance between the cord X and the cord Y becomes larger than W by $yz_2$. Further, when the cord X is rotated every 45° (FIGS. 5(c) to (h)), the increment in the distance between the cord X and the cord Y changes from $yz_3$ to $yz_8$.

In the above, as a method of calculating the increment in the bundle interval has described by way of an example where the cord X and the cord Y are rotated 45° individually. In the present invention, based on a similar idea, in a case where a cord X and cord Y rotate 360° per one pitch, the cord X and cord Y are rotated every 1° from the basic state to determine $xz_1$ to $xz_{360}$ and $yz_1$ to $yz_{360}$. Based on the obtained value, an expected value of increment in bundle interval is calculated by the following formula:

$$\text{Expected value of increment in bundle interval} = \frac{\sum_{i=1}^{360}\sum_{j=1}^{360} xzi + yzj}{129600}.$$

Although a case where the cord has a (1×2) structure has been explained as an example, for a cord having other structures, an expected value of increment in bundle interval can be calculated in the same procedure.

By using a bundle of two cords in which the expected value of increment in bundle interval calculated by the above-mentioned formula is increased by a/4 (mm) or larger, preferably 4a/11 (mm) or larger as a belt reinforcing material, a pneumatic radial tire having excellent durability and lightweight properties without compromising rigidity can be obtained. Examples of cord structures satisfying the above-mentioned relationship include a (1×2) structure and a (1+1) structure.

In the present invention, the end count of the belt reinforcing material is preferably 35 to 65 counts/50 mm, and more preferably, 40 to 59 counts/50 mm. When the end count is less than the above-mentioned range, a tensile strength may not be ensured, which is not preferred. On the other hand, when the end count is more than the above-mentioned range, it becomes difficult to ensure a bundle interval and to effectively inhibit a belt edge separation, which may deteriorate the durability. This is also not preferred.

In the present invention, from the viewpoint of reducing the weight of a tire and improving the durability of a tire, the thickness of the belt layer is preferably larger than 0.70 mm and smaller than 1.20 mm. When the thickness of the belt layer is 0.70 mm or smaller, a sufficient durability may not be obtained. On the other hand, when the thickness of the belt layer is 1.20 mm or larger, a sufficient light weight effect may not be obtained. More preferably, the thickness is from 0.80 to 1.10 mm.

In the present invention, the diameter of the filament constituting the cord is preferably 0.23 to 0.30 mm. When the filament diameter is less than 0.23, a sufficient strength may not be obtained. On the other hand, when the filament diameter is larger than 0.30, the thickness of the belt becomes thick and sufficient light weight properties may not be obtained.

In the present invention, conditions such as the direction of twist and twist pitch of each filament are not particularly restricted and can be appropriately configured according to a common procedure depending on the applications. The material or the like of the filament is not particularly restricted and steel filament is suitable. As the steel filament, those having a tensile strength of, suitably 2700 N/mm² or higher can be suitably used. As a mono filament cord having a high tensile strength, those containing at least 0.72 mass %, in particular, at least 0.82 mass % of carbon can be suitably used.

Other specific tire structures of the pneumatic radial tire of the present invention are not particularly restricted as long as the structure of the belt satisfies the above-mentioned requirements. As a gas for filling the tire, a normal air or an air in which the oxygen partial pressure is adjusted, as well as an inert gas such as nitrogen, argon or helium can be used.

EXAMPLES

In the following, the present invention will be described in detail by way of Examples.

Examples 1 to 8

Two steel cords having a structure as shown in the Tables 1 and 2 below were used to form a bundle and the bundle was employed as a belt reinforcing material, and by using the obtained belt reinforcing material, tires of types as shown in FIG. 1 were manufactured in a tire size of 225/45R17. The angle of embedded belt reinforcing material was ±26° with respect to the tire circumferential direction. For each of the obtained tires, the wear resistance (rigidity), durability and tire weight were evaluated according to the following procedure.

Conventional Example

Steel cords having a structure as shown in the Table 3 below was used as a belt reinforcing material, and by using the obtained belt reinforcing material, tires of types as shown in FIG. 1 were manufactured in a tire size of 225/45R17. The angle of embedded belt reinforcing material was ±26° with respect to the tire circumferential direction. For each of the obtained tires, the wear resistance (rigidity), durability and tire weight were evaluated according to the following procedure.

Comparative Examples 1 to 3

Steel cords having a structure as shown in the Table 3 below were used as a belt reinforcing material, and by using the obtained belt reinforcing material, tires of types as shown in FIG. 1 were manufactured in a tire size of 225/45R17. The angle of embedded belt reinforcing material was ±26° with respect to the tire circumferential direction. For each of the obtained tires, the wear resistance (rigidity), durability and tire weight were evaluated according to the following procedure.

<Wear Resistance>

A tire groove depth (center rib groove) remaining after endurance running of an actual vehicle (20 runs of existing circuit which is 3.5 km in length in a limit running mode) was measured to evaluate the tire, and an index evaluation was performed by setting a tire of the Conventional Example to 100. When the value of the index was 100±2, the evaluation was Δ as being the same as a conventional product; when the value of the index was larger than 102, the evaluation was ○; and when the value of the index was smaller than 98, the evaluation was x. The results are listed on Tables 1 to 3 in combination. Small wear resistance means a small tread contact area, which is a criteria of rigidity of the belt.

<Durability>

Each test tire was mounted on a standard rim which is defined in JATMA standards, and then, the tire was inflated to an inner pressure corresponding to the maximum load capability in JATMA YEAR BOOK, which was mounted on a passenger vehicle. After 40,000 km running on a pavement, the tire were dissected and the length of separation at a belt edge portion was investigated. The smaller the value, the better the result. When the result is equal to or the same as the tire of the Conventional Example, the evaluation was ○; when the result was poorer than the tire of the Conventional Example, the evaluation was x. The results are listed in Tables 1 to 3 in combination.

<Tire Weight>

The weight of each tire was measured, and index evaluation was performed by setting the tire of the Conventional Example to 100. When the value was less than 100, the evaluation was ○; when the value was 100 or higher, the evaluation was x. The results are listed on Tables 1 to 3 in combination.

TABLE 1

|  | Example 1 | Example 2 | Example 3 | Example 4 |
|---|---|---|---|---|
| cord structure | 1 × 2 × 0.250 | 1 × 2 × 0.250 | 1 + 1 × 0.250 | 1 × 2 × 0.250 |
| filament diameter a (mm) | 0.250 | 0.250 | 0.250 | 0.250 |
| end count (count/50 mm) | 58.5 | 58.5 | 58.5 | 58.5 |
| the number of bundles (count) | 2 | 2 | 2 | 2 |
| belt layer thickness (mm) | 0.990 | 0.800 | 0.990 | 1.200 |
| gauge (mm) | 0.995 | 0.799 | 0.995 | 1.199 |
| interval of circumcircle of cord (mm) | 0.71 | 0.71 | 0.71 | 0.71 |
| a/4 (mm) | 0.0625 | 0.0625 | 0.0625 | 0.0625 |
| 4a/11 (mm) | 0.0909 | 0.0909 | 0.0909 | 0.0909 |
| expected value of increment in bundle interval (mm) | 0.099 | 0.099 | 0.099 | 0.099 |
| wear resistance (index/judgment) | 100 / Δ | 104 / ○ | 100 / Δ | 99 / Δ |
| durability (mm/judgment) | 3 / ○ | 5 / ○ | 5 / ○ | 2 / ○ |
| tire weight (index/judgment) | 97 / ○ | 95 / ○ | 97 / ○ | 99 / ○ |

TABLE 2

|  | Example 5 | Example 6 | Example 7 | Example 8 |
|---|---|---|---|---|
| cord structure | 1 × 2 × 0.230 | 1 × 2 × 0.300 | 1 × 2 × 0.250 | 1 × 2 × 0.250 |
| filament diameter a (mm) | 0.230 | 0.300 | 0.250 | 0.250 |
| end count (count/50 mm) | 62.5 | 45.5 | 60.0 | 58.5 |
| the number of bundles (count) | 2 | 2 | 2 | 2 |
| belt layer thickness (mm) | 1.030 | 1.100 | 0.990 | 1.100 |
| gauge (mm) | 1.026 | 1.109 | 0.994 | 1.095 |
| interval of circumcircle of cord (mm) | 0.68 | 1.00 | 0.67 | 0.71 |
| a/4 (mm) | 0.0575 | 0.0750 | 0.0625 | 0.0625 |
| 4a/11 (mm) | 0.0836 | 0.1091 | 0.0909 | 0.0909 |
| expected value of increment in bundle interval (mm) | 0.091 | 0.119 | 0.099 | 0.099 |
| wear resistance (index/judgment) | 100<br>Δ | 98<br>Δ | 104<br>○ | 101<br>Δ |
| durability (mm/judgment) | 4<br>○ | 4<br>○ | 5<br>○ | 4<br>○ |
| tire weight (index/judgment) | 97<br>○ | 99<br>○ | 97<br>○ | 98<br>○ |

TABLE 3

|  | Conventional Example | Comparative Example 1 | Comparative Example 2 | Comparative Example 3 |
|---|---|---|---|---|
| cord structure | 1 × 5 × 0.225 | 1 × 5 × 0.225 | 1 × 2 × 0.250 | 1 × 3 × 0.300 |
| filament diameter a (mm) | 0.225 | 0.225 | 0.250 | 0.300 |
| end count (count/50 mm) | 35.0 | 35.0 | 58.4 | 40.0 |
| the number of bundles (count) | 0 | 2 | 0 | 2 |
| belt layer thickness (mm) | 1.100 | 1.100 | 0.990 | 0.900 |
| gauge (mm) | 1.099 | 1.099 | 0.995 | 0.930 |
| interval of circumcircle of cord (mm) | 0.85 | 1.70 | 0.355 | 0.60 |
| a/4 (mm) | 0.0563 | 0.0563 | 0.0625 | 0.075 |
| 4a/11 (mm) | 0.0818 | 0.0818 | 0.0909 | 0.1091 |
| expected value of increment in bundle interval (mm) | 0 | 0 | 0 | 0 |
| wear resistance (index/judgment) | 100<br>— | 93<br>x | 103<br>○ | 102<br>Δ |
| durability (mm/judgment) | 5<br>— | 2<br>○ | 10<br>x | 10<br>x |
| tire weight (index/judgment) | 100<br>— | 100<br>x | 97<br>○ | 100<br>x |

By the Tables 1 to 3, it is confirmed that the tire of the present invention had excellent durability and lightweight properties without compromising rigidity.

DESCRIPTION OF SYMBOLS

1 Tread portion
2 Sidewall portion
3 Bead portion
4 Carcass
5a First belt layer
5b Second belt layer
6, 16 Bundle
7, 17 Filament
8, 18 Circumcircle

The invention claimed is:

1. A pneumatic radial tire comprising:
 a carcass composed of at least one carcass layer extending toroidally between a left-and-right pair of bead cores;
 a tread portion which is arranged on the outside in the tire radial direction of a crown region of the carcass to form a ground contacting portion; and
 a belt composed of at least two belt layers which is arranged between the tread portion and the crown region of the carcass to form a reinforcing portion,
 a reinforcing material constituting the belt layer is a bundle formed by arranging two cords without twisting them; each of the cords has a (1×2) structure consisting of two filaments, wherein the diameters of all filaments constituting the cord are the same, and, the diameter of each of the filaments being a (mm), an expected value of increment in bundle interval between adjacent bundles is a/4 (mm) or more greater than the interval between the adjacent bundles represented by using the circumcircle of the cord.

2. The pneumatic radial tire according to claim 1, wherein the thickness of the belt layer is larger than 0.70 mm and smaller than 1.20 mm.

3. The pneumatic radial tire according to claim 1, wherein the filament diameter is from 0.23 to 0.30 mm.

4. The pneumatic radial tire according to claim 1, wherein the expected value of increment in bundle interval between the adjacent bundles at the first location is 4a/11 (mm) or more greater than the interval between the adjacent bundles represented by using the circumcircle of the cord.

* * * * *